United States Patent
Colombo et al.

(10) Patent No.: US 11,210,161 B2
(45) Date of Patent: *Dec. 28, 2021

(54) PROCESSING SYSTEM, RELATED INTEGRATED CIRCUIT, DEVICE AND METHOD

(71) Applicants: STMicroelectronics Application GMBH, Aschheim-Dornach (DE); STMicroelectronics S.r.l., Agrate Brianza (IT)

(72) Inventors: Roberto Colombo, Munich (DE); Nicolas Bernard Grossier, Oreno di Vimercate (IT); Roberta Vittimani, Agrate Brianza (IT)

(73) Assignees: STMicroelectronics Application GMBH, Ascheim-Dornach (DE); STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,768

(22) Filed: Jul. 14, 2020

(65) Prior Publication Data
US 2020/0341836 A1 Oct. 29, 2020

Related U.S. Application Data

(63) Continuation of application No. 15/975,507, filed on May 9, 2018, now Pat. No. 10,754,723.

(30) Foreign Application Priority Data

May 9, 2017 (IT) ........................ 102017000050166

(51) Int. Cl.
*G06F 11/00* (2006.01)
*G06F 11/08* (2006.01)
(Continued)

(52) U.S. Cl.
CPC ............ *G06F 11/08* (2013.01); *G06F 11/006* (2013.01); *G06F 11/079* (2013.01);
(Continued)

(58) Field of Classification Search
CPC .. G06F 11/08; G06F 11/0736; G06F 11/0793; G06F 11/1402;
(Continued)

(56) References Cited

U.S. PATENT DOCUMENTS 9,495,239 B1 11/2016 Ahmad et al.
2004/0025086 A1 2/2004 Gorday et al.
(Continued)

FOREIGN PATENT DOCUMENTS

GB 2255212 A 10/1992
WO 2014125326 A1 8/2014

OTHER PUBLICATIONS

Khan, J., "ISO 26262 System Level Functional Safety Validation for Battery Management Systems in Automobiles", International Conference on Innovations in Power and Advanced Computing Technologies, Apr. 21-22, 2017, 5 pages.

*Primary Examiner* — Michael Maskulinski
(74) *Attorney, Agent, or Firm* — Slater Matsil, LLP

(57) ABSTRACT

In some embodiments, a processing system includes at least one hardware block configured to change operation as a function of configuration data, a non-volatile memory including the configuration data for the at least one hardware block, and a configuration module configured to read the configuration data from the non-volatile memory and provide the configuration data read from the non-volatile memory to the at least one hardware block. The configuration module is configured to: receive mode configuration data; read the configuration data from the non-volatile memory; test whether the configuration data contain errors by verifying whether the configuration data are corrupted (Continued)

and/or invalid; and activate a normal operation mode or an error operation mode based on whether the configuration data contain or do not contain errors.

21 Claims, 10 Drawing Sheets

(51) Int. Cl.
 *G06F 11/30* (2006.01)
 *G06F 11/14* (2006.01)
 *G06F 11/07* (2006.01)
 *G06F 11/22* (2006.01)

(52) U.S. Cl.
 CPC ...... *G06F 11/0736* (2013.01); *G06F 11/0796* (2013.01); *G06F 11/1402* (2013.01); *G06F 11/142* (2013.01); *G06F 11/2247* (2013.01); *G06F 11/3065* (2013.01)

(58) Field of Classification Search
 CPC ..... G06F 11/1415–142; G06F 11/2247; G06F 11/2284; G06F 11/2289
 See application file for complete search history.

(56) References Cited

U.S. PATENT DOCUMENTS

| | | |
|---|---|---|
| 2004/0044925 A1 | 3/2004 | Piper et al. |
| 2004/0139443 A1 | 7/2004 | Hatle et al. |
| 2006/0143515 A1 | 6/2006 | Kuramkote et al. |
| 2009/0172471 A1* | 7/2009 | Zimmer .............. G06F 11/0793 714/17 |
| 2009/0306849 A1 | 12/2009 | Blanz et al. |
| 2012/0096319 A1 | 4/2012 | Wang et al. |
| 2014/0115317 A1* | 4/2014 | Su ....................... G06F 11/2284 713/100 |
| 2015/0339467 A1* | 11/2015 | Morita ................ G06F 21/6218 726/1 |
| 2016/0055338 A1* | 2/2016 | Jeansonne ............ G06F 3/0688 713/2 |
| 2016/0078208 A1* | 3/2016 | Namiki ............... G06F 21/6218 726/1 |
| 2016/0146888 A1 | 5/2016 | Vooka et al. |
| 2017/0124354 A1* | 5/2017 | Rohleder ................ G09C 1/00 |
| 2018/0101458 A1 | 4/2018 | Kumar et al. |
| 2018/0260280 A1 | 9/2018 | Traykov et al. |

* cited by examiner

| Inputs | | | | | Outputs | |
|---|---|---|---|---|---|---|
| Data corruption (ERR) | Life Cycle | Reset Mode | Safe Secure Mode | Diagnostic Mode | Client data source | Diagnostic Mode test features |
| NO | Don't care | Don't care | Don't care | Don't care | As read from NVM | Disabled |
| YES | Production or Failure Analysis | Enabled | Disabled | Disabled | Reset value | Disabled |
| | | Disabled | Disabled | Enabled | Reset value | Enabled |
| | | Disabled | Enabled | Disabled | Safe Secure value | Disabled |
| | | Disabled | Enabled | Enabled | Safe Secure value | Enabled |
| | | other combinations | | | Reset value | Disabled |
| | Customer Delivery or OEM Production | Don't care | | | Reset value | Disabled |
| | In Field | Enabled | Disabled | Don't care | Reset value | Disabled |
| | | Disabled | Enabled | Don't care | Safe Secure value | Disabled |
| | | other combinations | | | Reset value | Disabled |

FIG. 13

PROCESSING SYSTEM, RELATED INTEGRATED CIRCUIT, DEVICE AND METHOD

CROSS-REFERENCE TO RELATED APPLICATIONS

This application is a continuation of U.S. patent application Ser. No. 15/975,507, filed May 9, 2018, which application claims priority to Italian Application No. 102017000050166, filed on May 9, 2017, which applications are hereby incorporated herein by reference.

TECHNICAL FIELD

Embodiments of the present disclosure relate to processing systems, such as micro-controllers, having associated a memory in which configuration data are stored.

BACKGROUND

FIG. 1 shows a typical electronic system, such as the electronic system of a vehicle, comprising a plurality of processing systems $10_x$, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems $10_x$ are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generation of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.). For example, complexity is expected to increase in particular in the context of the forthcoming Car2X and autonomous driving world, because safety and security of the processing systems $10_x$ will become more and more relevant.

Usually, safety is intended to guarantee the functionality in case of both random and systematic faults, e.g., due to the corruption of "functional-critical" configuration data programmed during the production of the micro-controller, such as calibration data or other types of configuration data used to trim and/or configure the device functionalities. For example, the specification ISO 26262 dictates a complete process and the requirements to achieve a functionality being compliant within the chosen safety goals.

Conversely, security is intended to guarantee the protection of the internal resources against malicious attacks, which, for example, might lead to the corruption of the above mentioned data. For example, encryption of the communications between the various systems will become mandatory for the upcoming Car2X and autonomous driving scenario.

Thus, while achieving different and possible diverging goals, safety and security should be treated in conjunction. For example, this becomes evident when considering a possible abnormal behavior of a processing system $1o$ of the vehicle. From a safety point of view, the micro-controller should still be able to operate permitting an operation of the vehicle, even in a "degraded" mode. Conversely, from a security point of view, it might be advisable to stop the car, e.g., because the car might have been hacked. Unfortunately, the distinction of malfunctions or security faults may often not be taken, e.g., because often it is rather difficult to determine the actual failure root.

SUMMARY

In view of the above, some embodiments improve safety, security and diagnosis tasks of a processing system, such as a micro-controller.

One or more embodiments include a processing system having the features specifically set forth in the specification and claims that follow. Embodiments moreover concern a related integrated circuit, device and method.

As mentioned before, various embodiments of the present disclosure provide solutions for managing the operation of a processing system.

In various embodiments, the processing system includes at least one hardware block configured to change operation as a function of configuration data, a non-volatile memory including the configuration data for the at least one hardware block, and a configuration block configured to read the configuration data from the non-volatile memory and provide the configuration data read from the non-volatile memory to the at least one hardware block. For example, in various embodiments, the processing system may include a processing unit, such as a microprocessor, and the configuration data may be stored in the non-volatile program memory for storing the firmware of the processing unit.

Specifically, in various embodiments, the configuration block is configured to receive mode configuration data, read the configuration data from the non-volatile memory and test whether the configuration data contain errors by verifying whether the configuration data are corrupted and/or invalid.

In various embodiments, in case the configuration data do not contain errors, the configuration block may activate a normal operation mode of the processing system by providing the configuration data read from the non-volatile memory to the at least one hardware block.

Conversely, in various embodiments, in case the configuration data do contain errors, the configuration block may activate an error operation mode of the processing system as a function of the mode configuration data. For example, the configuration module may provide reset values to the at least one hardware block when the mode configuration data indicate that a reset mode should be activated, and provide preset configuration data to the at least one hardware block when the mode configuration data indicate that a degraded mode should be activated. In various embodiments, the configuration block, may also activate a diagnostic module of the processing system when the mode configuration data indicate that a diagnostic mode should be activated.

For example, in various embodiments, the configuration block includes at least one configuration data client including a register for storing configuration data, where the configuration data stored in the register are provided to at least one hardware block.

In this case, the configuration block may also include a configuration module. For example, the configuration module may include a hardware data read module configured to read the configuration data from the non-volatile memory and a hardware dispatch module configured to send the configuration data read from the non-volatile memory to the at least one configuration data client. For example, each configuration data client may have associated a respective address, and the hardware dispatch module may send the configuration data to the configuration data clients in the form of data packets addressed to a given configuration data client.

In various embodiments, the configuration module includes also a hardware error and diagnostic module configured to test whether the configuration data contain errors by verifying whether the configuration data are corrupted and/or invalid, and in case the configuration data do contain errors, the error and diagnostic module may activate an error operation mode of the processing system as a function of the mode configuration data. Specifically, the error and diagnostic module may: set a degraded mode signal when the mode configuration data indicate that the degraded mode, e.g., safe secure mode (SSM), should be activated; optionally set a diagnostic mode signal provided to the diagnostic module of the processing system when the mode configuration data indicate that the diagnostic mode should be activated; and set a reset mode signal provided to a reset module of the processing system when the mode configuration data indicate that the reset mode should be activated.

In this case, one or more of the configuration data clients may be configured to: when the reset module indicates that a reset should be performed, store the reset values in the register; when the degraded mode signal is set, store the preset configuration data in the register, and otherwise, store the configuration data received from the hardware dispatch module in the register.

In various embodiments, the mode configuration data are stored in the non-volatile memory including also the configuration data. In this case, also the configuration module may have associated a configuration data client, i.e., the configuration module may read via the data read module the mode configuration data from the non-volatile memory and send the mode configuration data via the dispatch module to the configuration data client associated with the configuration module. Accordingly, the error and diagnostic module may receive the mode configuration data from the configuration data client associated with the configuration module.

In various embodiments, the configuration block may also activate the error operation mode of the processing system as a function of additional life cycle data.

BRIEF DESCRIPTION OF THE DRAWINGS

Embodiments of the present disclosure will now be described with reference to the annexed drawings, which are provided purely by way of non-limiting example and in which:

FIGS. 12-13 show another embodiment of a processing system.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following Figures, parts, elements or components which have already been described with reference to a previous Figure are denoted by the same references previously used in such Figures; the description of such previously described elements will not be repeated in the following in order not to overburden the present detailed description.

Figure 1:
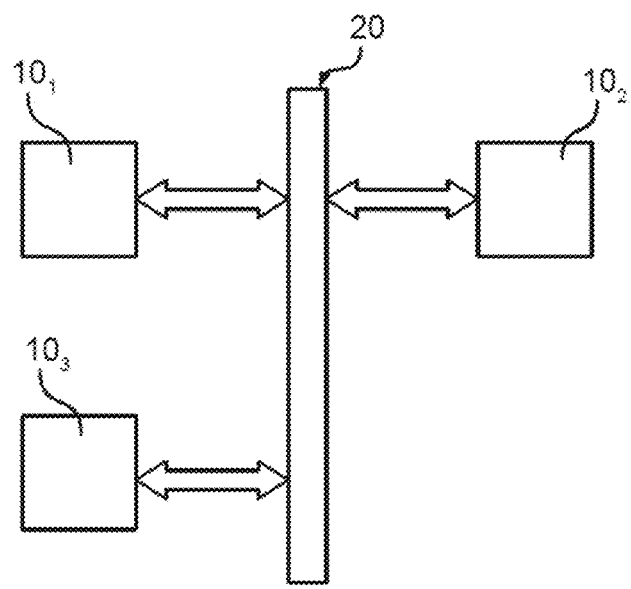
FIG. 1 shows a typical electronic system.
Figure 2:
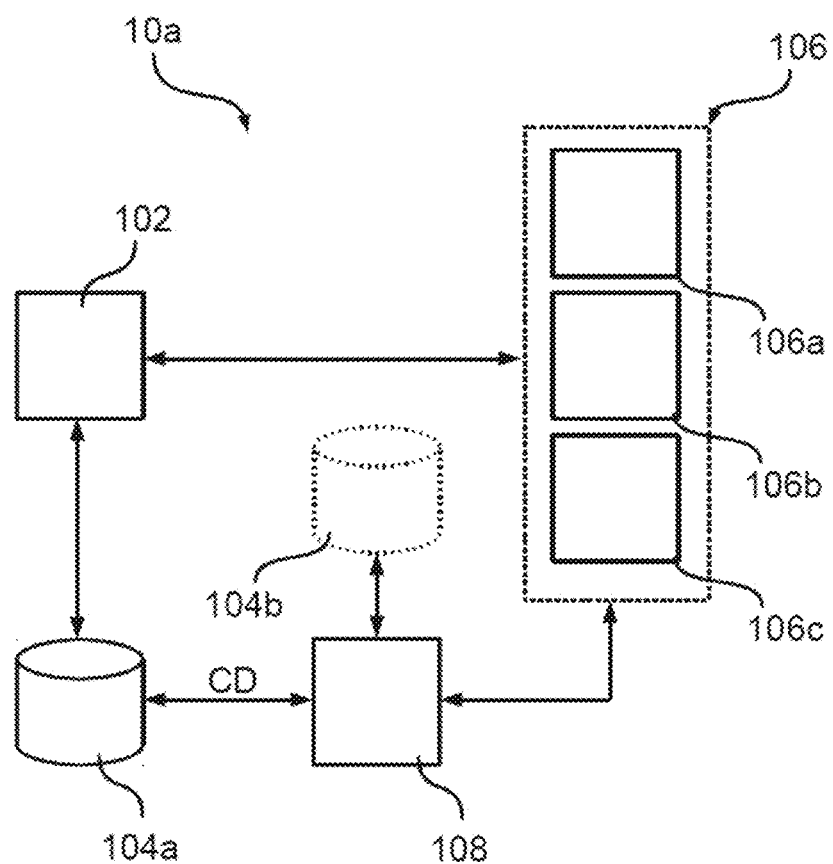
FIG. 2 shows an embodiment of a processing system comprising a configuration module in accordance with the present disclosure.

FIG. 2 shows a block diagram of an embodiment of a digital processing system 10a, such as a micro-controller. Digital processing system 10a may be any of the processing systems $10_x$ shown in FIG. 1.

In the embodiment considered, the processing system boa comprises at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g., via the traces of a printed circuit board. Thus, in general the memory 104a contains the firmware for the processing unit 102, where the term firmware includes both the software of a micro-processor and the programming data of a programmable logic circuits, such as a FPGA.

In the embodiment considered, the processing unit 102 may have associated one or more resources 106, such as: one or more communication interfaces, such as Universal asynchronous receiver/transmitter (UART), Serial Peripheral Interface (SPI) Bus, Inter-Integrated Circuit (I2C), Controller Area Network (CAN) bus, Ethernet, a debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a Pulse-Width Modulation (PWM) driver.

Accordingly, the digital processing systems 10a may support different functionalities.

For example, the processing systems may have different hardware architectures. For example, the processing units 102 may have different architectures and processing speeds, and/or the number and type of the hardware resources 106 may vary.

Moreover, even assuming a substantially identical hardware architecture, the behavior of the processing unit 102 is determined by the firmware stored in the memory 104a, e.g., the software instructions to be executed by a microprocessor 102 of a micro-controller 10a. Thus, by installing a different firmware, the same hardware (e.g., micro-controller) can be used for different applications.

Often, the behavior of the processing system 10a may also be varied based on configuration data written, e.g., during the production stage. For example, these configuration data may be written into specific areas of the non-volatile memory 104a and retrieved when the processing system 10a is powered on. Alternatively or in addition, the configuration data may be stored in an additional non-volatile memory 104b, such as a one-time programmable (OTP) memory, e.g., implemented with fuses.

For example, the program memory 104a may be used, in case the blocks shown in FIG. 2 are integrated in a common integrated circuit. Conversely, an additional memory 104b may be used, in case the program memory 104a is an external memory, and only the other blocks are integrated in a common integrated circuit. Accordingly, in various embodiments, the configuration data CD are stored in a non-volatile memory (104a and/or 104b) of the integrated circuit comprising the block requiring configuration data, such as the processing unit 102 and/or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g., the micro-controller producer.

However, the configuration data CD may also be used to customize the behavior of the hardware, e.g., the hardware resources 106, according to different application needs. For example, once the firmware of the processing system has been stored in the processing system 10a, some configuration data may be written in order to deactivate the debug interface, which e.g., could be used to download the firmware of the processing system.

Thus, generally a first part of the configuration data CD may be written by the producer of the hardware of the processing system (e.g., the producer/manufacturer of an integrated circuit), and/or a second part of the configuration data CD may be written by the developer of the firmware of the processing system 10a.

As mentioned before, the programmed configuration data CD may be read during a reset phase, which usually starts as soon as the processing system 10a is powered on.

Specifically, as shown in FIG. 2, the processing system 10a may include for this purpose a configuration module 108 configured to read the configuration data CD from the non-volatile memory 104a and/or 104b, and distribute these configuration data CD within the processing system 10a.

Figure 3:
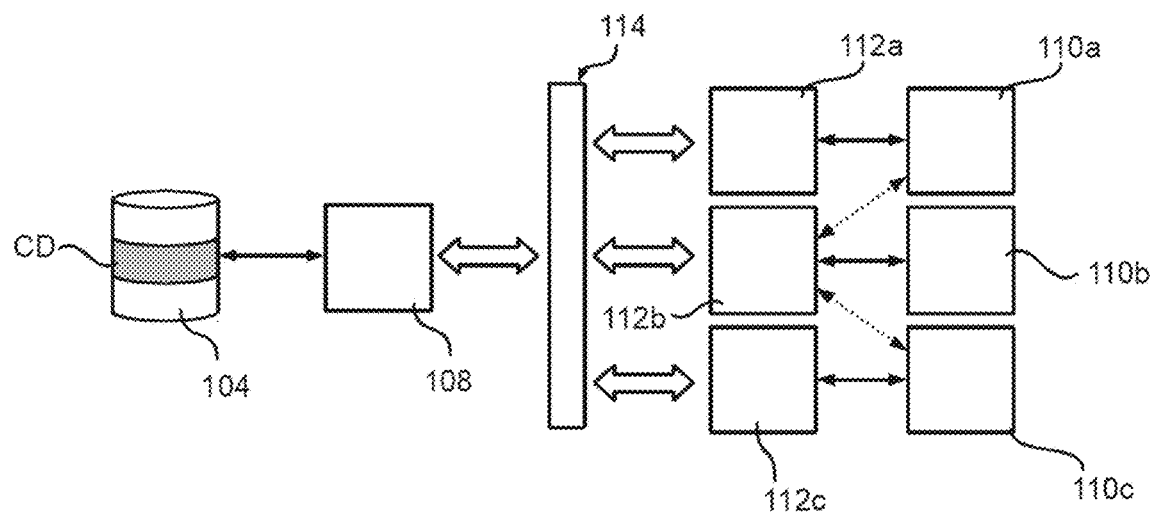
FIG. 3 shows the general architecture of an embodiment of a processing system comprising a configuration module and configuration data clients in accordance with the present disclosure.

For example, FIG. 3 shows a possible embodiment for distributing the configuration data in the processing system 10a of FIG. 2.

In the embodiment considered, one or more configuration data CD are stored in one or more non-volatile memories 104 (i.e., memories 104a and/or 104b). In various embodiments, these configuration data CD are stored in reserved memory areas, e.g., in the form of a plurality of consecutive memory locations.

Accordingly, in the embodiment considered, the configuration module 108 accesses the reserved memory areas containing the configuration data CD, reads the configuration data CD and transmits the configuration data CD to a respective block 110 within the processing system 10a. Generally, the block 110 may corresponds to any block of the processing system 10a requiring configuration data and may correspond to the processing unit 102, a hardware resource 106, or even a memory (e.g., the memory 104a). For example, the block 110 may be a power management controller of the processing system 10a, which may be configured to receive some calibration data for the internal voltage level trimming, and/or the various IPs, such as the hardware resources 106, whose behavior can be tailored by the customer according to their needs.

In order to distribute the configuration data, each block 110 may have associated a respective configuration data client 112. For example, in FIG. 3 are shown three blocks 110a, 110b and 110c and three configuration data clients 112a, 112b and 112c. Generally, each configuration data client 112 may be associated univocally to a single hardware block 110, and provided configuration data only to the associated hardware block 110, e.g., a specific hardware resource 106, or may be associated with a plurality of hardware blocks 110, e.g., a plurality of hardware resource 106. In general, the configuration data clients 112a, 112b and 112c may also be integrated in the respective block 110a, 110b and 110c.

Accordingly, in the embodiment considered, the configuration module 108 may determine the respective configuration data (selected from the configuration data CD) for each target block 110 to be configured and transmit the configuration data associated with the target block to the configuration data client 112 associated with the target block 110. Similarly, while reading the configuration data CD from the memory 104, the configuration module 108 may determine the target block(s) for the current configuration information and send the current configuration data to the configuration data client(s) associated with the respective target block(s). Generally, any communication may be used for transmitting the configuration data to the configuration data client 112, including both serial and parallel communications. For example, the configuration module 108 and the configuration data clients 112 may be connected via a bus 114, and each configuration data clients 112 may have associated a respective target address.

Accordingly, each configuration data client 112 is configured to receive the configuration data from the module 108, store them into the internal register, e.g., store them into one or more internal flip-flops or latches. The data stored in the register may then be used to generate one or more signals which influence the behavior of one or more hardware blocks 110. For example, the register may comprise a bit providing a flag specifying whether a certain protection (e.g., the possibility to write a certain area of the non-volatile memory) over some internal assets shall be applied or not, where this flag is provided to the hardware block in charge of enforcing this protection.

Thus, as mentioned before, the module 108 distributes the configuration data CD preferably during the reset phase.

However, the configuration data CD may also be corrupted. Accordingly, in this case, the processing system 10a may be kept in the reset phase. In fact, the reset phase is usually considered both a safe and secured state, e.g., because when the processing system 10a (in particular the processing unit 102 and possibly the resources 106) is under reset, it usually cannot damage the system it belongs to and it cannot be attacked. However, in the reset condition, availability and testability of the processing system 10a may not be ensured. However, availability might be an issue, especially for the Car2X and autonomous driving world, where the system should be ready to react to its inputs, i.e., the run-time functionalities provided by the processing system 10a should be available. Similarly, testability may not be possible when the processing system 10a is kept under reset, e.g., upon a failure, i.e., the processing system boa is unable to make a diagnosis of possible malfunctions.

In various embodiments, the processing system boa described with respect to FIGS. 2 and 3 is thus modified in order to permit, even in case of malfunction, safety, security, availability, and testability of the processing system boa.

Figure 4:
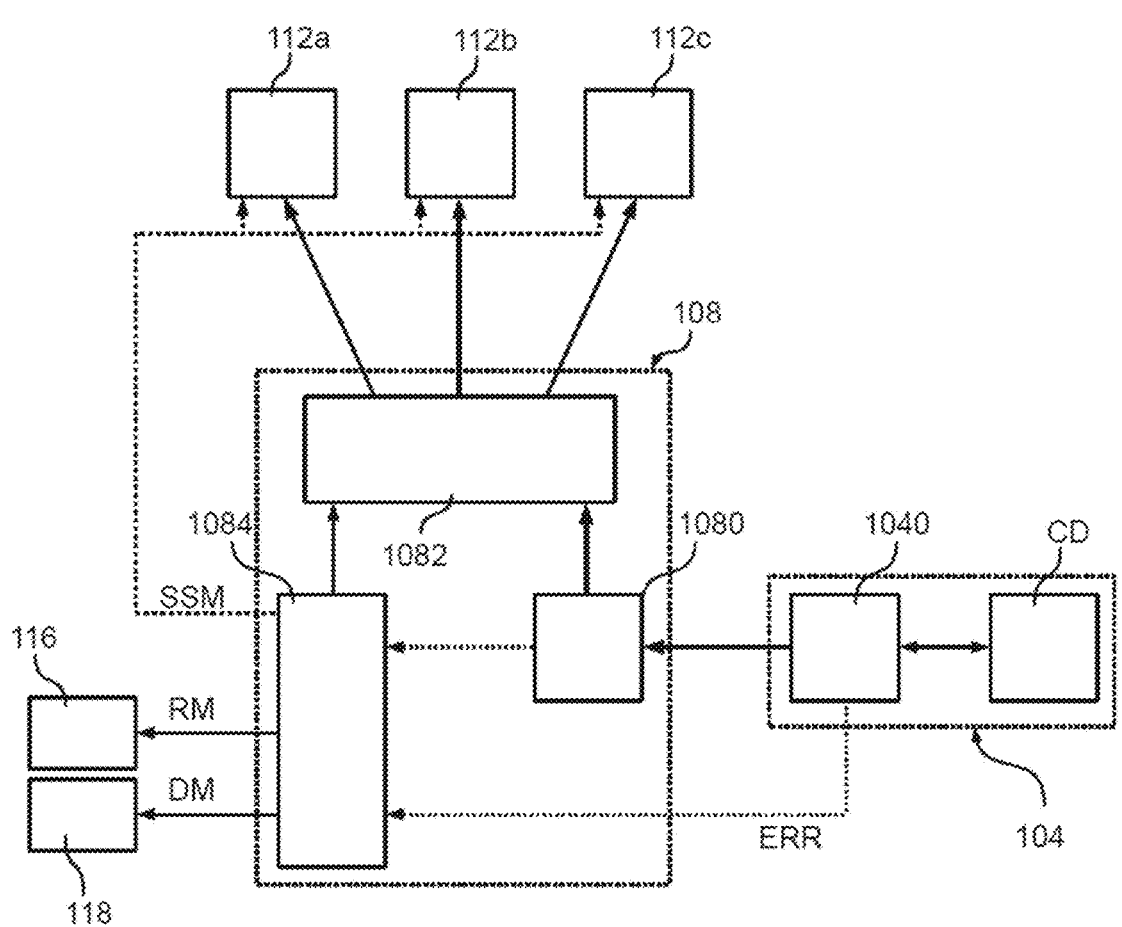
FIG. 4 shows a first embodiment of a processing system comprising a configuration module and configuration data clients in accordance with the present disclosure.

FIG. 4 shows in this regard a second embodiment of a processing system 10a in accordance with the present invention.

Specifically, also in this case, the processing system 10a comprises a configuration module 108 configured to read the configuration data CD form one or more non-volatile memories 104 (e.g., memories 104a and/or 104b, and a plurality of configuration data clients 112 configured to receive respective configuration data from the module 108 and distribute them among a plurality of blocks 110 (not shown) requiring configuration data. For example, as mentioned before, each configuration data client 112 may be associated univocally with a respective block 110.

For example, in the embodiment considered, the processing system 10a comprises three configuration data clients 112a, 112b and 112c.

In the embodiment considered, the configuration module 108 includes a data read module 1080 configured to read the configuration data CD from the memory 104 and a dispatch module 1082 configured to transmit the configuration data to the configuration data clients 112.

As mentioned before, any communication may be used for communication between the dispatch module 1082 and the configuration data clients 112. For example, in various embodiments, the communication between the dispatch module 1082 and the configuration data clients 112 is based on a data frames in accordance with a given format, called in the following Device Configuration Format (DCF). For example, in various embodiments, each data frame includes two fields: the payload (i.e., the real data), called DCF Format payload, and possible additional data attributes used to identify the receiver of the data, called DCF Format attributes, where the receiver is one of the configuration data clients 112 representing a DCF client. For example, the data attributes may consist in 16 or 32 bits, where a given number of bits specifies the address of one of the configuration data clients 112, and the payload may consist in 16 or 32 bits. For example, in various embodiments, the data read module 1080 is configured to read blocks of 64 bits from the memory 104, where the first 32 bits contain the data attributes (including the address of a configuration data client) and the second 32 bits contain the configuration data to be transmitted to the address specified in the data attributes.

As described before, each configuration data client/DCF client 112 may be a hardware module, usually including a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110. For example, as mentioned before, each configuration data client 112 may have associated a univocal address (i.e., univocal within each processing system 10a) and analyze the data transmitted by the dispatch module 1082 in order to determine whether the additional data attributes (DCF Format attributes) contain the address associated with the configuration data client 112.

As mentioned before, the data read by the module 108 from the non-volatile memory 104 may also be corrupted or not valid, and the module 108 should be able to activate different modes. Specifically, in the embodiment considered, the module 108 includes an error and diagnostic module 1084 configured to manage the various modes of operation of the processing system 10a.

For example, in various embodiments, corrupted data may be detected by storing one of more additional check bits together with the configuration data CD in the memory 104. Generally, these additional bits may be analyzed and compared with the configuration data read directly by a memory interface 1040 of the memory 104, or by the error and diagnostic module 1084. For example, the memory interface 1040 of the memory 104 may be used, in case the memory contains additional check bits for all data stored in the non-volatile memory 104, i.e., the memory may be a memory with Error-Correcting Code (ECC). For example, in this case the memory interface 1040 may generate an error signal ERR when the data read from the memory 104 are corrupted. Conversely, the error and diagnostic module 1084 may analyze the configuration data CD and the additional check bits, in case the additional check bits are stored only for the configuration data CD, e.g., when the additional check bits are stored in the data attributes field.

Similarly, in various embodiments, the error and diagnostic module 1084 may analyze the configuration data CD read from the memory 104 in order to determine invalid configuration data. Alternatively or in addition, each configuration data client 112 may also verify the configuration data received and determine whether the respective configuration data are valid. In this case, each configuration data client 112 may signal an error to the error and diagnostic module 1084 indicating that the received configuration data are invalid.

Accordingly, in various embodiments, once the processing system 10a is switched on, the error and diagnostic module 1084 may generate a reset mode signal RM for the reset module 116 of the processing system 10a in order to activate the reset state. Generally, this step is purely optional, because the reset module 116 could also activate automatically the reset state. Those of skill in the art will appreciate that the specific implementation of the reset module 116 depends on architecture of the processing system. For example, the reset module 116 may generate a reset pulse of a given number of clock cycles (e.g., one or more) provided to the blocks 110 of the processing system 10a.

Next, the data read module 1080 may read the configuration data CD from the memory 104 and the error and diagnostic module 1084 may determine (directly or indirectly via the memory interface 1040 of the memory 104) whether the configuration data CD are corrupted. In various embodiments, the error and diagnostic module 1084 may also determine whether the configuration data are valid.

Thus, in case the error and diagnostic module 1084 determines that the configuration data CD are not corrupted (and valid), the error and diagnostic module 1084 may send a signal to the dispatch module 1082 and the dispatch module 1082 may distribute the configuration data CD. Generally, the configuration data CD may be verified and distributed sequentially, or the complete configuration data CD may be read and verified before these data are indeed transmitted to the various configuration data clients 112.

Thus, in the absence of error in the configuration data CD, the dispatch module 1082 will distribute the configuration data CD, thereby activating the processing system 10a, i.e., the various blocks 110 will use the configuration data CD stored in the memory 104 (normal operation mode).

Conversely, when the error and diagnostic module 1084 detects that the configuration data CD are corrupted (or invalid), the error and diagnostic module 1084 may perform different tasks.

For example, in various embodiments, the error and diagnostic module 1084 may drive the reset module 112 of the processing system 10a via the signal RM, in order to perform a new reset of the processing system 10a. Thus, in this case, the processing system 10a is kept in a reset mode when the configuration data are permanently corrupted or invalid.

In various embodiments, the processing system 10a may however support also further operation modes, such as a safe secure mode and/or a diagnostic mode.

For example, in various embodiments, the error and diagnostic module 1084 may activate the safe security mode by providing via the dispatch module 1082 a set of preset configuration data to the configuration data clients. Generally, the preset configuration data may also be stored directly within each configuration data client 112 and the error and diagnostic module 1084 may inform the configuration data clients 112, e.g., via a safe secure mode signal SSM, that the preset configuration data should be used. In various embodiments, these preset configuration data correspond to configuration data for operating the various blocks 110 in an ISO 26262 "degraded" mode, where preferably additional security features are activated. Accordingly, once each configuration data client 112 has stored the preset configuration data in the internal register, the processing system 10a is started and the various blocks 110 will use the preset configuration data.

Conversely, the error and diagnostic module 1084 may activate the diagnostic mode by activating via a diagnostic mode signal DM a diagnostic module 118, so called design for testability (DFT), of the processing system 10a. Those of skill in the art will appreciate that the specific implementation of the diagnostic module 118 depends on the architecture of the processing system. For example, the diagnostic block 118 may be configured to instruct the various blocks 110 of the processing system 10a to perform a given sequence of tasks, thereby executing a predefined test cycle. For example, during the test cycle, the blocks 110 may be instructed to generate given output signals at the pins of the processing system 10a.

Accordingly, in various embodiments, once having determined whether the configuration data CD are corrupted and/or valid, the error and diagnostic module 1084 may activate one of the following error states: normal operation mode, where the configuration data stored in the memory 104 are used, reset mode, safe secure mode, where the preset configuration data are used, or diagnostic mode.

In various embodiments, the above modes of operation are not mutually exclusive, but as will be described in the following, different combinations of them are possible by providing appropriate preset configuration information to the various blocks 110, and activating or deactivating the reset module 116 and the diagnostic module 118. Moreover, some blocks 110 may use the configuration data stored in the memory 104, while the blocks 11o with corrupted/invalid configuration data may use the preset configuration data.

Figure 5:
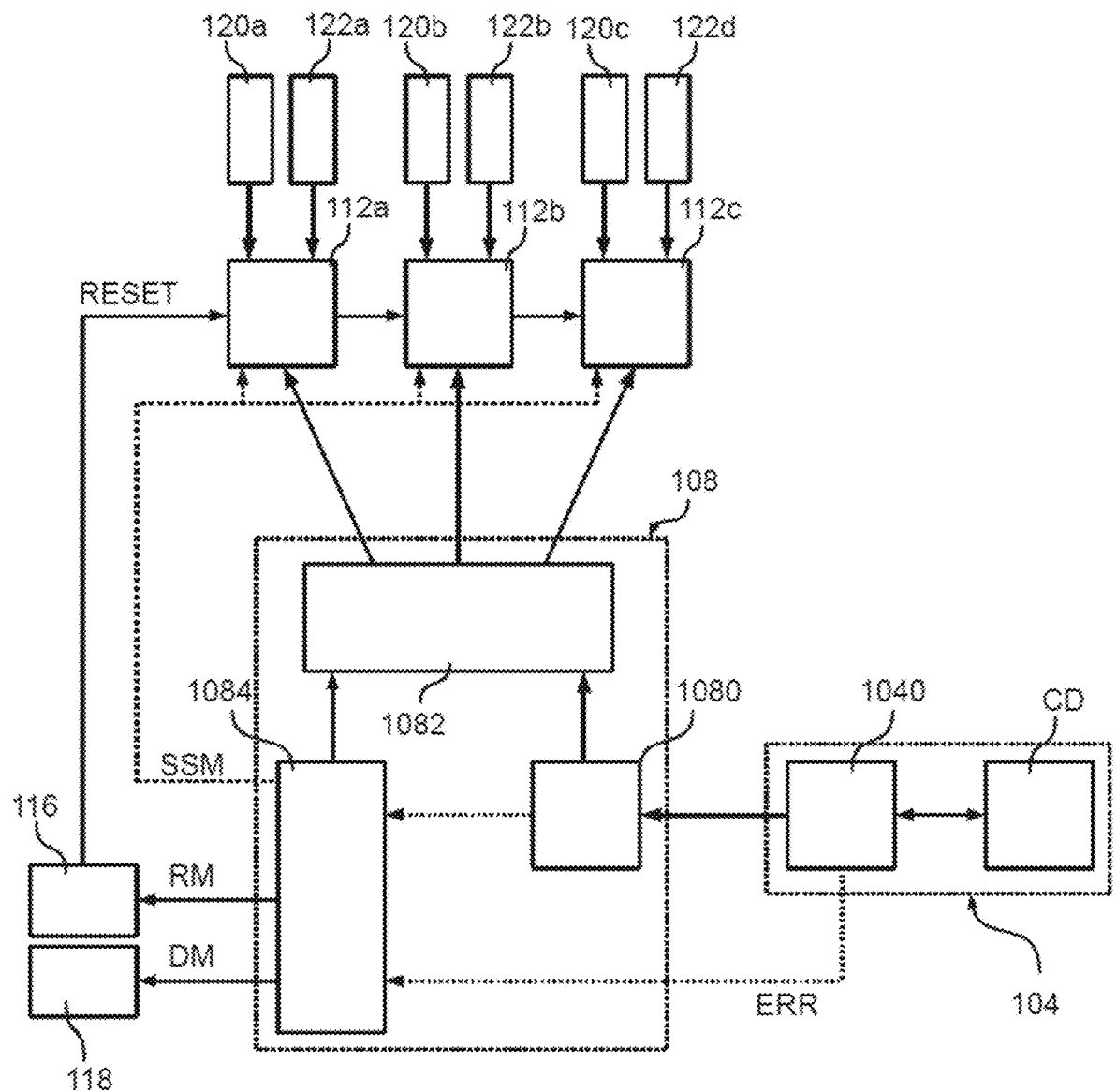
FIG. 5 shows a second embodiment of a processing system comprising a configuration module and configuration data clients in accordance with the present disclosure.

FIG. 5 shows a possible embodiment of the above operations.

In the embodiment considered, the complete management of the operation modes of the processing system 10a is again managed by the error and diagnostic module 1084, representing thus a mode selection circuit.

Moreover, in the embodiment considered, the configuration data CD are stored in the non-volatile memory 104, which is configured to determine whether the configuration data are corrupted. For example, in the embodiment considered, the memory 104 includes a memory interface 1040 configured to determine, e.g., based on additional ECC bits stored in the memory 104, a signal ERR indicating whether the configuration data CD are corrupted.

Accordingly, in the embodiment considered, the data read module 1080 is configured to read the configuration data CD from the memory 104 and the memory 104 signals also whether the data read are corrupted, e.g., via the signal ERR transmitted to the module 1084.

In the embodiment considered, the dispatch module 1082 provides the configuration data read from the memory to the various configuration data clients 112.

Figure 6:
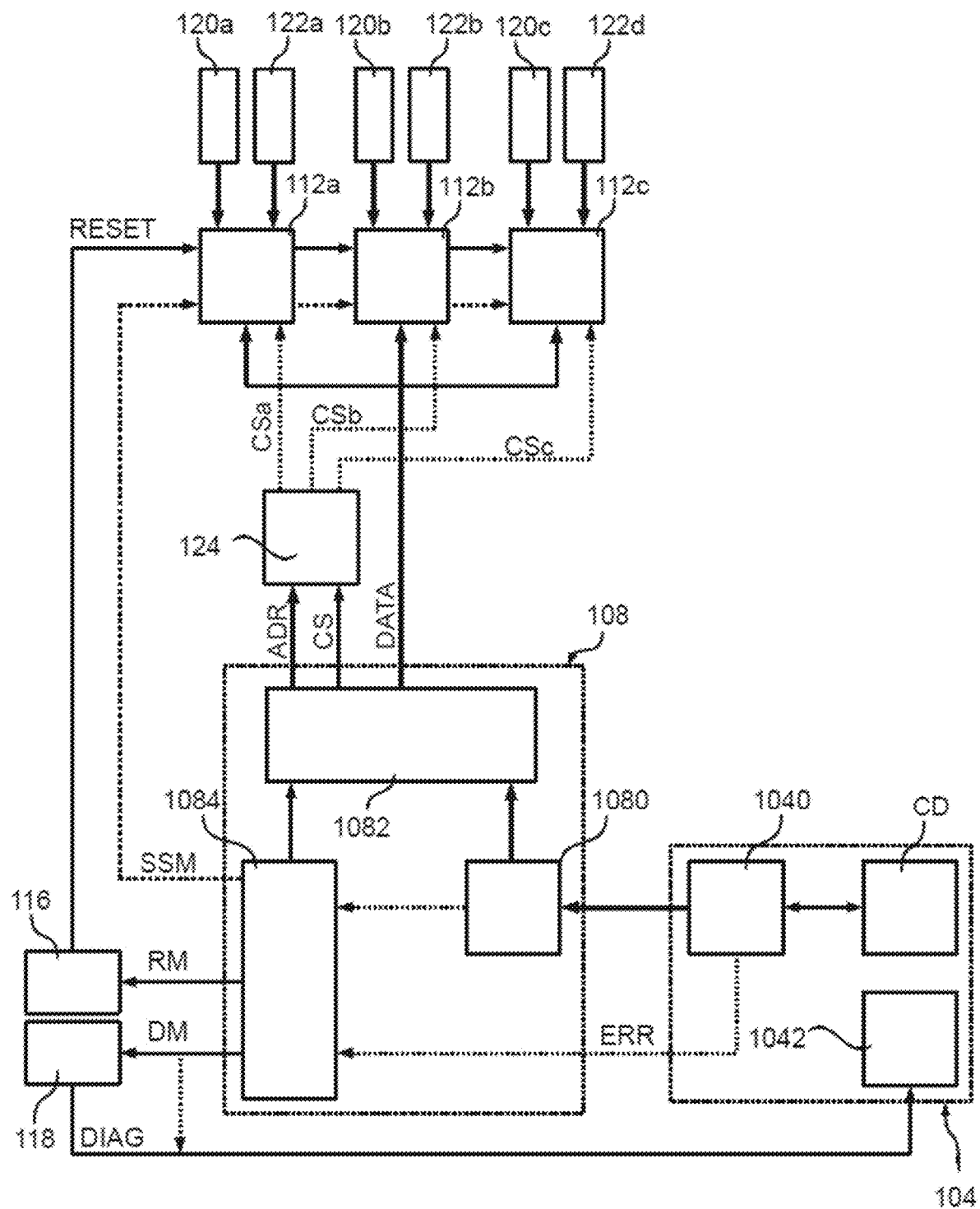
FIG. 6 shows a third embodiment of a processing system comprising a configuration module and configuration data clients in accordance with the present disclosure.

For example, as shown in FIG. 6, the dispatch module 1082 may generate a data signal DATA having a given number of bits (corresponding to the bits of the payload) containing the configuration data to be transmitted to a given configuration data client 112 and further control signals for selecting the target configuration data client (i.e., the additional data attributes). For example, in the embodiment shown in FIG. 6, the dispatch module 1082 generates also an address signal ADR containing the address of the target configuration data client 112 and optionally a chip select signal CS used to signal to the configuration data clients 112 that the address signal ADD and the data signal DATA are valid.

For example, in various embodiments (see FIG. 6), the address signal ADR (and the chip select signal CS) may be provided to a decoder 124 configured to activate one of the configuration data clients 112 as a function of the address signal ADR. For example, in the embodiment considered, the decoder 124 may set a chip select signal CSa in order to indicate that the configuration data client 112a should read the data signal DATA when the address signal ADR corresponds to an address assigned to the configuration data client 1a (and the chip select signal CS is set). Similarly, the decoder 124 may set a chip select signal CSb in order to indicate that the configuration data client 112b should read the data signal DATA when the address signal ADR corresponds to an address assigned to the configuration data client 112b (and the chip select signal CS is set), etc.

Accordingly, in various embodiments (see, e.g., FIG. 5), each configuration data client 112 may receive at input various data signals, selected as a function of a reset signal RESET generate by the reset module 112 and the safe security mode SSM signal generated by the module 108, in particular the error and diagnostic module 1084:

when the reset signal indicates that the reset state is activated, respective reset data 120 being either hardwired or stored in a non-volatile memory, when the signal SSM indicates that the safe security mode is activated, respective preset configuration data 122 being either hardwired or stored in a non-volatile memory, or when the reset signal indicates that the reset state is not activated and the signal SSM indicates that the safe security mode is not activated, the data provided by the dispatch module 1082.

Figure 7:
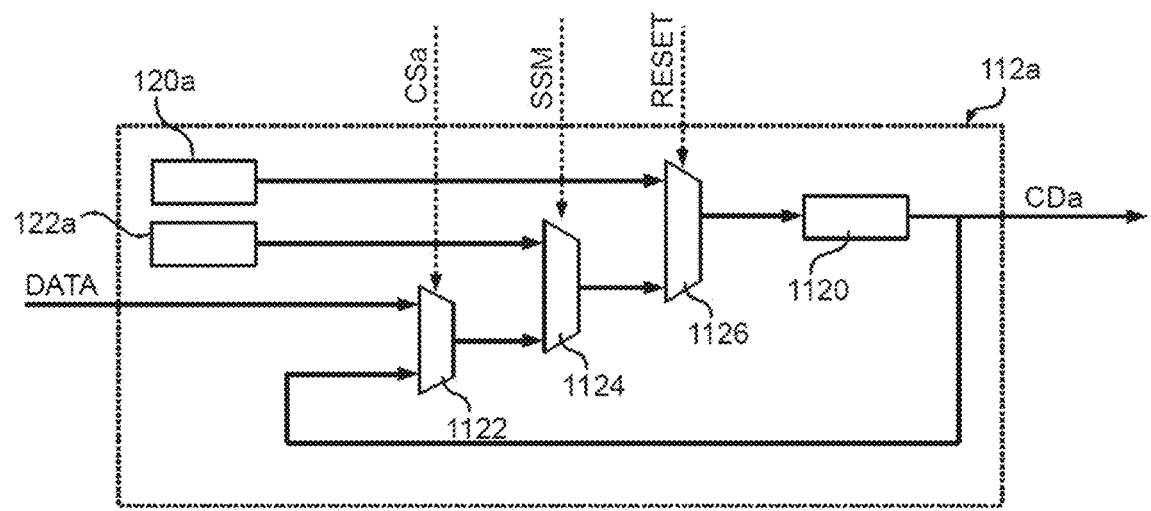
FIG. 7 shows an embodiment of a configuration data client adapted to be used in the processing systems of FIG. 6.

For example, FIG. 7 shows a possible embodiment of the configuration data client 112a which may be used in the embodiment shown in FIG. 6. The same architecture may also be used for the other configuration data client.

As mentioned before, the configuration data client 112a has associated reset data 120a and preset configuration data 122a. For example, in the embodiment considered, these data are hardwired within the configuration data client 112a.

Moreover, the configuration data client 112a receives at input the configuration data DATA from the dispatch module.

Accordingly, in the embodiment considered, the configuration data client 112a is configured to store one of these data (reset, preset configuration data or received configuration data) in an internal register 1120 as a function of the chip select signal CSa, the safe secure mode signal SSM and the reset signal RESET.

For example, in the embodiment considered, the configuration data client 112a includes: a first multiplexer 1122 configured to select either the data signal DATA or the current content CDa of the register 112o as a function of the chip select signal CSa; a second multiplexer 1124 configured to select either the preset configuration data 122a or the signal at the output of the first multiplexer 1122 as a function of the safe secure mode signal SSM; and a third multiplexer 1126 configured to select either the reset configuration data 120a or the signal at the output of the second multiplexer 1124 as a function of the reset signal RESET.

Accordingly, when the reset signal RESET is set, the reset data 120a will be stored in the register 1120. Conversely, when the reset signal is not set and the safe secure mode signal SSM is set, the preset configuration data 122a will be stored in the register 1120. Conversely, if both signal are not set, the chip select signal CSa determines whether the data DATA or the previous configuration data CDa should be stored in the register 1120.

As mentioned before, in various embodiments, the switching between the various operation states of the processing system 10a is managed by the error and diagnostic module 1084. For example, in various embodiments, the module 1084 may support the following modes:

a reset mode, and a normal operation mode, and a safe secure mode, and/or an optionally diagnostic mode.

In various embodiments, the module 1084 activates the reset mode when the processing system 10a is switched on. During this mode, the module 1084 drives the reset module 116, which thus generates the reset signal RESET and the various configuration data clients load the reset data into the internal register.

Once the configuration data clients 112 have stored the reset data and the blocks 110 have been reset, the module 108 reads the configuration data CD from the non-volatile memory 104 via the data read module 1080 and transmits the configuration data read to the various configuration data clients 112, thereby overwriting the reset data.

During this operation, errors can happen, e.g., because the memory interface 1040 signals that the data are corrupted. Accordingly, once the error and diagnostic module 1084 has determined (e.g., via the memory interface 1040) that given configuration data are corrupted, the error and diagnostic module 1084 may enable the safe secure mode and/or the diagnostic mode.

For example, the error and diagnostic module 1084 may activate the safe secure mode by setting the signal SSM, whereby the configuration data clients 112 read the respective preset configuration data 122.

Conversely, the error and diagnostic module 1084 may activate the diagnostic mode by sending a signal DM to the diagnostic module 118. This diagnostic module 114 may then activate diagnostic functions in the various blocks 110. For example, as shown in FIG. 6, also the memory 104 may comprise a test logic 1042 configured to verify the non-volatile memory 104 and a signal DIAG generated by the diagnostic module 118 or directly the signal DM may be used to activate this test logic 1042.

Accordingly, in case the processing system 10a, in particular the configuration data clients 112, supports both the safe secure mode and the diagnostic mode, the error and diagnostic module 1084 requires some additional information in order to decide whether the safe secure mode and/or the diagnostic mode should be activated.

In various embodiments, this information, representing mode configuration data MCD, may be stored in a non-volatile memory, such as a one-time programmable memory, associated with the module 108. Conversely, in other embodiments, this information is stored in the non-volatile memory 104.

For example, in various embodiments, the mode configuration data are encoded with plurality of bits, where: a first keyword/bit sequence indicates that only the safe secure mode should be activated, a second keyword/bit sequence indicates that only the diagnostic mode should be activated, and a third keyword/bit sequence indicates that both the safe secure mode and the diagnostic mode should be activated.

Generally, a single keyword/bit sequence may be used for all blocks 110, i.e., the error and diagnostic module 1084 is configured to activate the safe secure mode and/or the diagnostic mode for all blocks 110. Alternatively, a respective keyword/bit sequence may be stored for each block 110, i.e., the error and diagnostic module 1084 is configured to selectively activate the safe secure mode and/or the diagnostic mode for each block 110.

Figure 8:
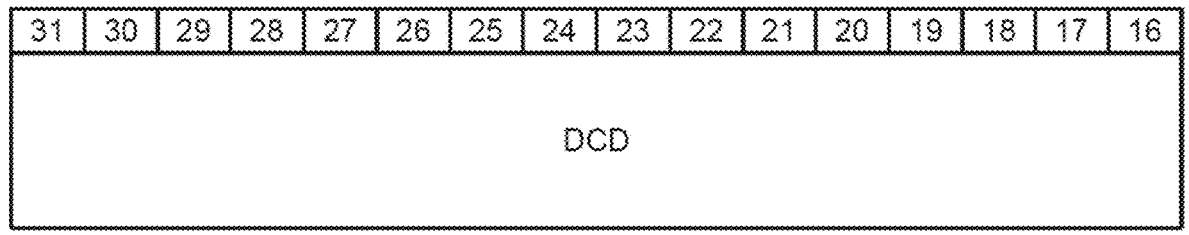
FIG. 8 shows an embodiment of mode configuration data adapted to be used to set the behavior of the configuration module.
Figure 8:
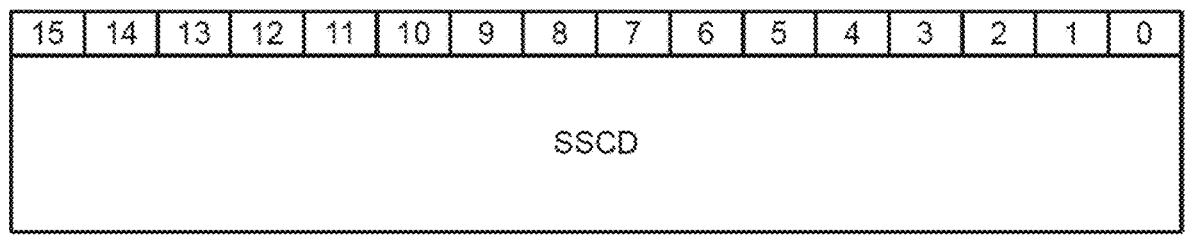

For example, as shown in FIG. 8 the memory 104 may provide the mode configuration data MCD consisting in a given number of bits, such as 32 bits, where a first subset of the bits, e.g., the bits [31:16], are associated with the diagnostic mode, and a second subset of the bits, e.g., the bits [15:0], are associated with the safe secure mode. Accordingly, when the first subset of bits corresponds to a given reference bit sequence, e.g., 0xD1A6, the module 1084 may activate the diagnostic mode by setting the signal DIAG, and when the second subset of bits corresponds to a given reference bit sequence, e.g., 0x5F5A, the module 1084 may activate the safe secure mode by setting the signal SSM.

Accordingly, in the embodiment considered:

the keyword/bit sequence 0xD1A60000 indicates that only the diagnostic mode should be activated;

the keyword/bit sequence 0x00005E5A indicates that only the safe secure mode should be activated; and the keyword/bit sequence 0xD1A65E5A indicates that both the diagnostic mode and the safe secure mode should be activated.

Conversely, in case neither the first nor the second subset of bits corresponds to the respective bit sequences (diagnostic mode and safe secure mode are deactivated), the module 1084 may activate the reset mode via the reset module 116. Accordingly, in the embodiment considered, the reset mode is also activated when bits of the mode configuration data MCD are corrupted. In this regard, the use of a plurality of bits for the first and second subset of bits ensures that a single bit error of these mode configuration data MCD may not activate incidentally the diagnostic mode or the safe secure mode, but at most the reset state is activated.

As mentioned before, the mode configuration data MCD may be stored directly in the non-volatile memory 104, i.e., the memory in which are also stored the configuration data CD. In various embodiments, the mode configuration data are stored at one or more fixed memory locations of the non-volatile memory or together with the configuration data.

Figure 9:
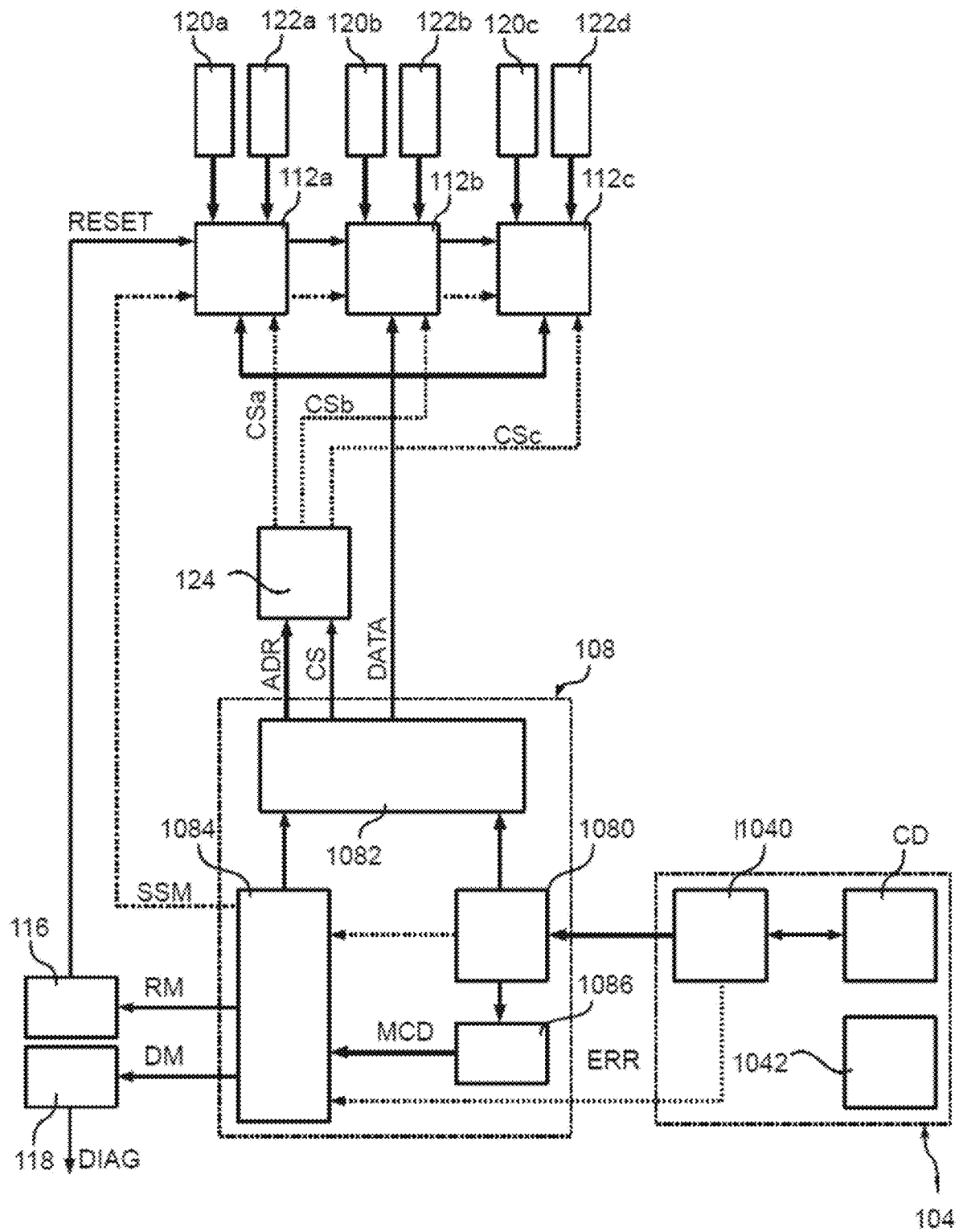
FIG. 9 shows a first embodiment of a processing system comprising a configuration module and configuration data clients in accordance with the present disclosure, wherein mode configuration data are used to set the behavior of the configuration module.

For example, FIG. 9 shows an embodiment, in which the mode configuration data MCD are stored at one or more fixed memory locations. In this case, the module 108 may read the mode configuration data MCD via the data read module 1080 and store them in an internal register 1086. Thus, once an error occurred, the module 1084 may compare the mode configuration data MCD stored in the internal register 1086 with the respective reference bit sequences in order to decide which error more (reset, diagnostic or safe secure mode) should be activated.

Similarly, also in case the mode configuration data are stored together with the configuration data, the module 108 may extract the mode configuration data and store them in the internal register 1086.

Figure 10:
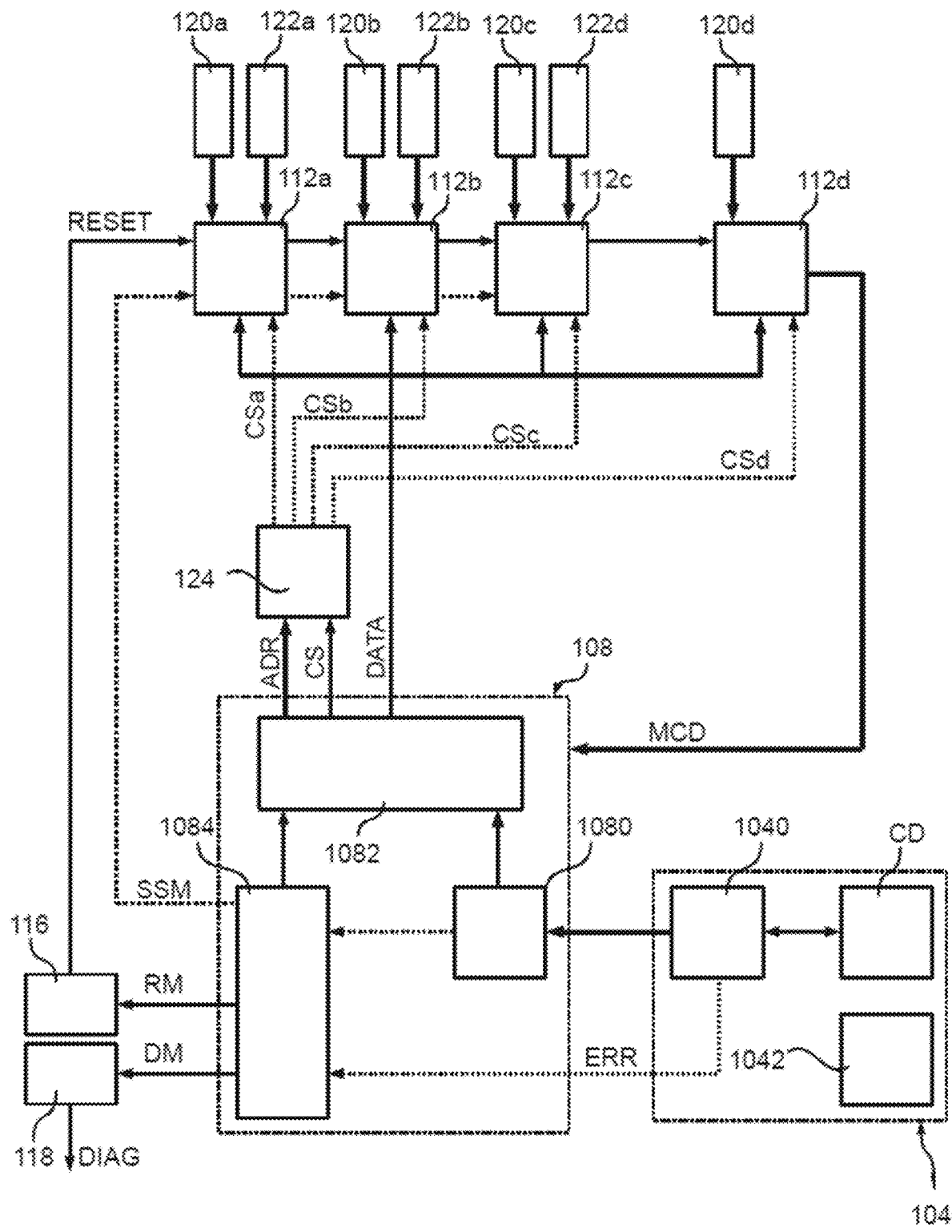
FIG. 10 shows a second embodiment of a processing system including a configuration module and configuration data clients in accordance with the present disclosure, where mode configuration data are used to set the behavior of the configuration module.

Conversely, FIG. 10 shows an embodiment, in which an additional configuration data client 112*d* is used. Generally, the previous description of the configuration data clients 112 applies also to this client 112*d*. For example, the configuration data client 112*d* is configured to store in an internal register during a reset state a given reset value 120*d* and overwrite the reset values by storing the data received from the module 108. Moreover, when using a bus system, the configuration data client 112*d* may have associated a respective address ADR. For example, in the embodiment considered, the decoder 124 may generate a chip select signal CSd when the address ADR provided by the module 108 corresponds to the address associated with the configuration data client 112*d*.

In the embodiment considered, the configuration data client 112*d* does not have associated preset values 122*d*. For this reason, the multiplexer 1124 in FIG. 7 may also be omitted. Alternatively, the architecture of the other configuration data clients 112 (as shown, e.g., in FIG. 7) may be used, by simply setting the respective preset configuration data 122 to the reset values 120.

Accordingly, in the embodiment considered, the configuration module 108, in particular the dispatch module 1082, distributes the configuration data CD read from the memory 104 to the various configuration data clients 112, without knowing that these data include also the mode configuration data MCD. In the embodiment considered, the configuration data client 112*d* represents thus the configuration data client associated with the configuration module 108, where the configuration data client 112*d* provides the mode configuration data MCD the configuration module 108, in particular the error and diagnostic module 1084. Accordingly, in the embodiment considered, the module 108 passes the mode configuration data read from the memory 104 to the configuration data client 112*d* and receives from the same the stored configuration data, i.e., the mode configuration data MCD.

Accordingly, in the embodiments discussed in the foregoing, the memory interface 1042 may report via the signal ERR a data error to the module 108 and the error and diagnostic module 1084 may determine the reaction of the processing systems 10*a* by means of the signals SSM, DM and RM.

For example, the module 1082 may trigger a new reset by driving the reset module 112 via the signal RM. Accordingly, the processing system 10*a* (including the blocks 110 and the also the configuration module 108) will perform a new restart. The configuration data clients 112 will thus re-load the default reset values 120 (which is fixed at design time) in response to the reset signal RESET generate by the reset module 116. Next, the configuration module 108 will perform a new attempt to read the configuration data CD from the non-volatile memory 104. Accordingly, in case the configuration data are permanently corrupted, the processing system 10*a* may be kept in the reset mode by performing an infinite number of reset loops. Generally, the configuration module 108 may also monitor the number of resets performed and interrupt the reset loop.

Alternatively, the mode configuration data MCD may indicate that the preset configuration data 122 should be used. In various embodiments, this mode may only be activated once the configuration module 108 has read the mode configuration data MCD from the memory 104 (and possibly transmitted to the configuration data client 112*d*). Once activated, the error and diagnostic module 1084 generates the signal SSM, and the configuration data clients 112 associated with the blocks 110 (in particular the clients 112*a*-112*c*) will load the preset configuration data 122. As mentioned before, the configuration data client 112*d* associated with the module 108 may not have associates preset configuration data 122.

Similar to the reset values 120, also the preset configuration data 122 may be fixed during the design of the processing system 10*a*, e.g., hardwired. As mentioned before, each block 110 should be designed that in response to the preset configuration data 122, the block 110 should still be able to operate, possibly with reduced device functionality. Accordingly, once the signal SSM is set, the configuration data clients 112*a*-112*c* will replace the reset data 12*o* (or already loaded configuration data) with the preset configuration data 122.

Conversely, in case the mode configuration data MCD indicate that the diagnostic mode should be used, the error and diagnostic module 1084 may generate the signal DM in order to activate the diagnostic module 118, which e.g., performs one or more system tests. Again, in various embodiments, this mode may only be activated once the configuration module 108 has read the mode configuration data MCD from the memory 104 (and possibly transmitted to the configuration data client 112*d*). For example, once activated, several internal signals might be exposed on some internal non-bonded pads. Another possibility is that the non-volatile memory 104 might enable some test features on some areas of the memory that usually cannot be analyzed for security reason.

In various embodiments, the architecture discussed in the foregoing may indeed be used two times in the same processing system 10. In fact, a sub-set of configuration data may relate to security aspects, such as a cipher key to be used by a hardware secure element. These security related configuration data are usually stored in separate memory locations or a separate non-volatile memory. Moreover, usually, these security related configuration data are stored in encrypted format and the memory interface may be configured to decrypt these data.

Accordingly, either the same configuration module 108 and the same configuration data clients 112 may be used for distributing these two sets of configuration data, or two parallel architectures, each including a configuration module 108 and configuration data clients 112 may be used to distribute the configuration information independently. Moreover, while the same configuration module 108 may be used, indeed each block 110 may have associated two or more independent configuration data clients 112, e.g., one for the non-security related configuration data and another for the security related configuration data.

In various embodiments, the above modes may thus be activated by writing the mode configuration data into the memory 104. However, at least the diagnostic mode may provide sensible data from a security point of reason, e.g., because the memory interface 1040 could perform a sequential readout of the data stored in the memory 104 and make the data available via one or more pads of the processing system 10*a*.

Figure 11:
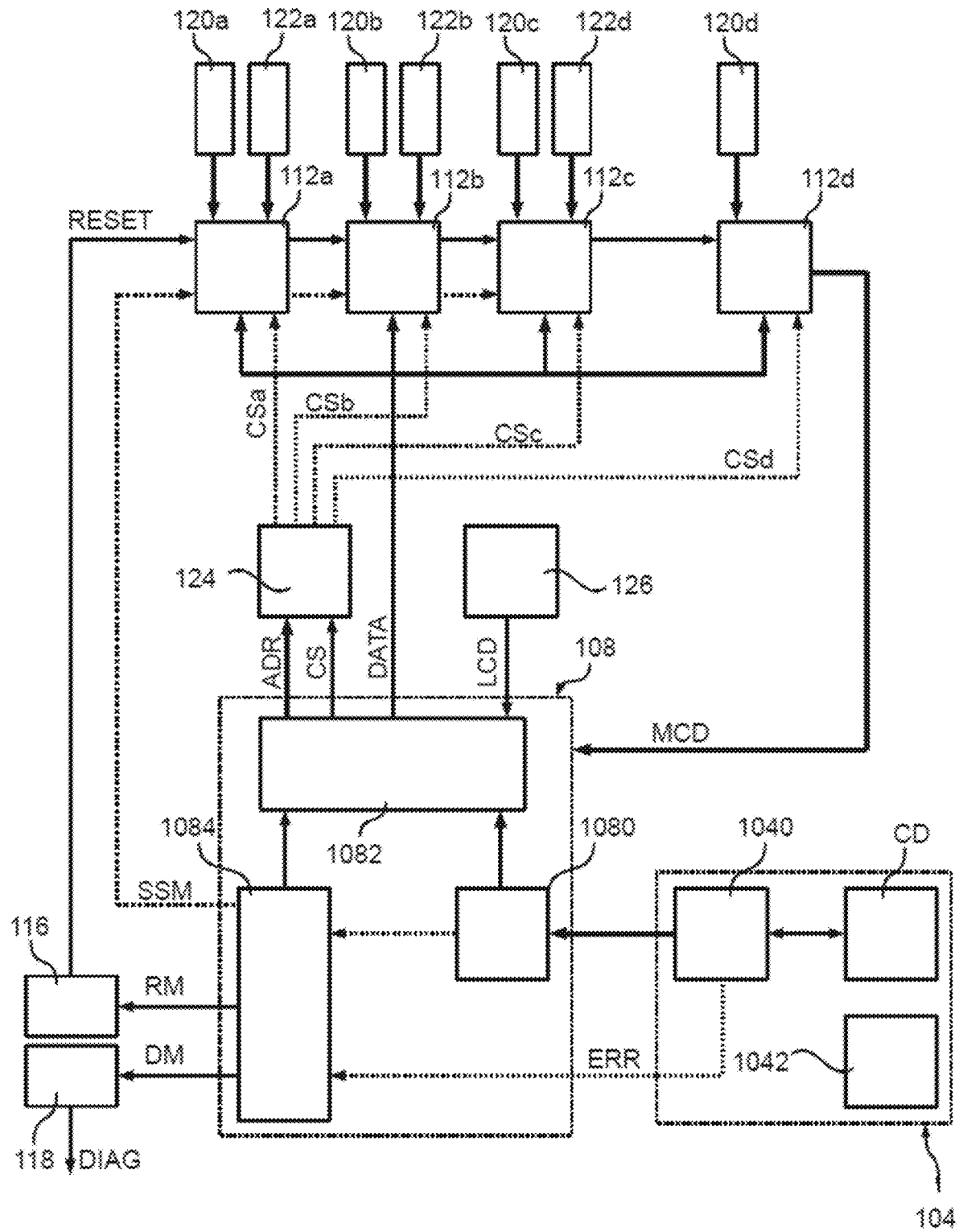
FIG. 11 shows an embodiment of a processing system comprising a configuration module and configuration data clients in accordance with the present disclosure, where life cycle data are used to set the behavior of the configuration module.

FIG. 11 shows in this regard an embodiment, in which the configuration module 108 is configured to take into account also the life cycle of the processing system. For example, this life cycle may be encoded with a bit sequence. Preferably, this bit sequence is stored in a non-volatile memory 126, preferably a one-time programmable memory. In general, this life cycle data LCD may also be stored at reserved memory locations of the memory 104.

For example, in various embodiments, the bit sequence LCD stored in the memory 122 may indicate one of the following stages:

"production", when the processing system 10*a*, e.g., a micro-controller, is in the chip factory;

"customer delivery", when the processing system 10*a* has been shipped to the first tier customer (e.g., a producer of an engine control unit);

"OEM production", when the device has been shipped to a next-level customer (e.g., a car maker);

"in field", when the device is installed in the final product (e.g., in a car sold in the market);

"failure analysis", when the device is shipped back to producer of the processing system 10*a* for diagnostic purposes.

Accordingly, in various embodiments, the error and diagnostic module 1084 may not only take into account the mode configuration data MCD but also the product life cycle as indicated by the bit sequence LCD stored in the memory 126.

For example, as described in the foregoing, when the configuration data CD are not corrupted (and valid) the configuration module 108 may distribute the configuration data CD to the configuration data clients 112 and the processing system 10*a* is normally operated with these configuration data, i.e., the mode configuration data MCD and the product life cycle data LCD are not taken into account at all.

Conversely, the configuration module 108 uses these data only when the configuration data CD are corrupted (or invalid).

For example, when the life cycle data LCD indicate the "production" or "failure analysis" stage, the configuration module 108 may use the mode configuration data MCD, which may indicate that any of the previous modes may be activated (i.e., reset, diagnostic, safe secure or both diagnostic and safe secure). Specifically, in various embodiments, the reset mode corresponds to the default mode, which is used, e.g., in case the mode configuration data are corrupted (or invalid)

Conversely, when the life cycle data LCD indicate the "customer delivery" or "OEM production" stage, the configuration module 108 may disregard the mode configuration data MCD and the reset mode may be used by default.

Finally, when the life cycle data LCD indicate the "in field" stage, the module 108 may only permit an activation of the safe secure mode as an alternative to the default reset mode, i.e., the configuration module 108 may activate the safe secure mode only when the mode configuration data MCD indicate that the safe secure mode should be used.

Accordingly, in the embodiment considered, the diagnostic mode can only be activated by the producer of the processing system 10*a*, but cannot be activated, e.g., when the processing system 10*a* is indeed used ("in field" stage).

While in the previous description reference has been made to a safe secure mode being activated by the safe secure mode signal SSM, this mode corresponds in general to a downgraded mode, in which preset configuration data are used. In fact, only in case the blocks 110 of the processing system 10*a* support also security related options, the preset configuration data may activate also these security related features.

Figure 12:
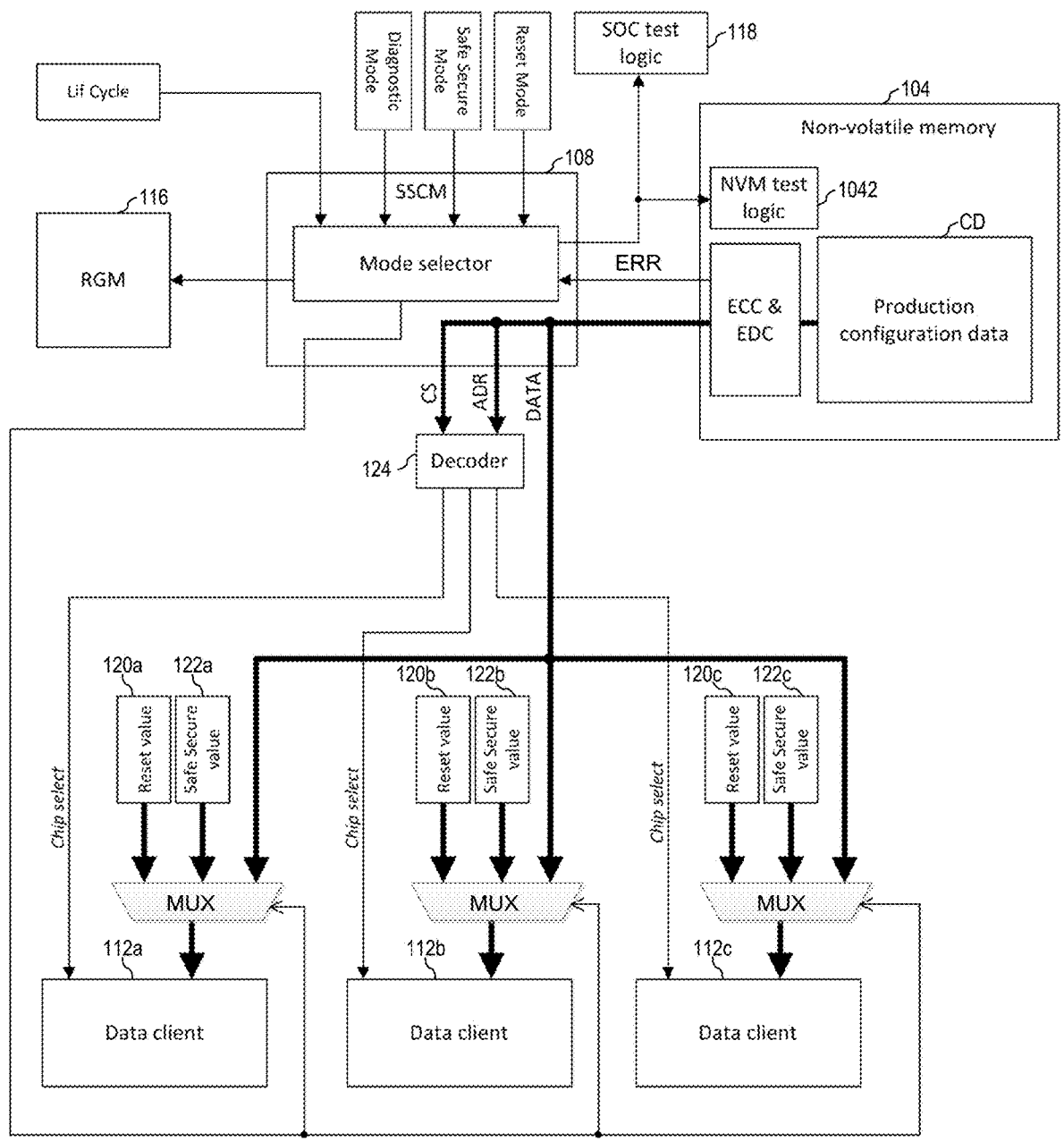

FIGS. 12-13 show another embodiment of a processing system. As shown in FIGS. 12 and 13, configuration module 108 may select the mode of data clients 112 and the source of their respective data based on a plurality of inputs. When error signal ERR is deasserted, the data client 112 operates normally based on the configuration data CD read from memory 104. When error signal ERR is asserted, the operation of the data client 112 is based on the life cycle input as well as on the reset mode, safe secure mode and diagnostic mode inputs.

In some embodiments, portions of configuration module 108 may be implemented in firmware or software. In other words, the method (or portions thereof) can be implemented using a processor and a non-transitory computer-readable storage medium storing a program to be executed by the processor. The program includes instructions for performing various embodiments as described herein.

Without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A method of operating a processing system, the method comprising:
   receiving mode configuration data;
   receiving life cycle data indicative of a life cycle state of the processing system;
   reading configuration data from a non-volatile memory;
   determining whether the configuration data contain errors by verifying whether the configuration data are corrupted or invalid;
   when the configuration data do not contain errors, activating a normal operation mode of the processing system by providing the configuration data read from the non-volatile memory to a hardware circuit; and
   when the configuration data do contain errors, activating an error operation mode of the processing system as a function of the mode configuration data and as a function of the life cycle data by:
      providing reset values to the hardware circuit when the mode configuration data indicate that a reset mode should be activated, and
      providing preset configuration data to the hardware circuit when the mode configuration data indicate that a degraded mode should be activated.

2. The method of claim 1, wherein providing preset configuration data comprises providing preset configuration data when a subset of bits of the mode configuration data is equal to a reference code, and wherein providing reset values comprises providing reset values when the subset of bits of the mode configuration data is different from the reference code.

3. The method of claim 2, wherein the reference code is equal to 0x5E5A.

4. The method of claim 1, further comprising activating a diagnostic mode of the processing system as a function of the mode configuration data and as a function of the life cycle data.

5. The method of claim 4, wherein activating the diagnostic mode comprises activating the diagnostic mode when a subset of bits of the mode configuration data is equal to a reference code and the life cycle data is indicative of the processing system being in a production state or a failure analysis state.

6. The method of claim 5, wherein the reference code is equal to 0xD1A6.

7. The method of claim 1, wherein the mode configuration data comprises 32 bits.

8. The method of claim 1, further comprising reading the life cycle data from the non-volatile memory.

9. The method of claim 1, wherein the life cycle state is a state from a set of predetermined states, wherein the set of predetermined states comprises a production state indicative of the processing system being at a factory, and an in-field state indicative of the processing system being installed in a product.

10. The method of claim 1, wherein providing reset values comprises using a reset signal to control a first multiplexer having a first input coupled to a reset register and an output coupled to an output register.

11. The method of claim 10, wherein providing preset configuration data comprises using a preset mode signal to control a second multiplexer having a first input coupled to a preset register and an output coupled to a second input of the first multiplexer.

12. The method of claim 11, further comprising using a chip select signal to control a third multiplexer having a first input receiving the configuration data, a second input coupled to the output register, and an output coupled to a second input of the second multiplexer.

13. The method of claim 1, wherein the configuration data are stored in consecutive memory locations of the non-volatile memory.

14. The method of claim 1, wherein the hardware circuit comprises a debug interface, an analog-to-digital converter, a digital-to-analog converter, a timer, a counter, a cryptographic co-processor, a comparator, a temperature sensor, or a pulse width modulation (PWM) driver.

15. A processing system comprising:
   a non-volatile memory; and
   a hardware circuit, wherein the processing system is configured to:
      read life cycle data from the non-volatile memory, the life cycle data being indicative of a life cycle state of the processing system,
      read configuration data from the non-volatile memory,
      determine whether the configuration data contain errors by verifying whether the configuration data are corrupted or invalid,
      when the configuration data do not contain errors, activate a normal operation mode of the processing system by providing the configuration data read from the non-volatile memory to the hardware circuit, and
      when the configuration data do contain errors, activate an error operation mode of the processing system as a function of mode configuration data and as a function of the life cycle data by:
         providing reset values to the hardware circuit when the mode configuration data indicate that a reset mode should be activated, and
         providing preset configuration data to the hardware circuit when the mode configuration data indicate that a degraded mode should be activated.

16. The processing system of claim 15, wherein the hardware circuit comprises:
   a reset register;
   an output register; and
   a first multiplexer having a first input coupled to the reset register and an output coupled to the output register, wherein the processing system is configured to provide the reset values by using a reset signal to control the first multiplexer.

17. The processing system of claim 16, wherein the hardware circuit further comprises:
   a preset register; and
   a second multiplexer having a first input coupled to the preset register and an output coupled to a second input of the first multiplexer, wherein the processing system is configured to provide the preset configuration data by using a preset signal to control the second multiplexer.

18. The processing system of claim 15, wherein the hardware circuit comprises a debug interface, an analog-to-digital converter, a digital-to-analog converter, a timer, a counter, a cryptographic co-processor, a comparator, a temperature sensor, or a pulse width modulation (PWM) driver.

19. An integrated circuit comprising:
a non-volatile memory; and
a plurality of hardware circuits, wherein the integrated circuit is configured to:
read life cycle data from the non-volatile memory, the life cycle data being indicative of a life cycle state of the integrated circuit,
read configuration data from the non-volatile memory,
determine whether the configuration data contain errors by verifying whether the configuration data are corrupted or invalid,
when the configuration data do not contain errors, activate a normal operation mode of the integrated circuit by providing the configuration data read from the non-volatile memory to a first hardware circuit of the plurality of hardware circuits, and
when the configuration data do contain errors, activate an error operation mode of the integrated circuit as a function of mode configuration data and as a function of the life cycle data by:
providing preset configuration data to the first hardware circuit when a subset of bits of the mode configuration data is equal to a reference code, and
providing reset values to the first hardware circuit when the subset of bits of the mode configuration data is different from the reference code.

20. The integrated circuit of claim 19, wherein the integrated circuit is further configured to activate a diagnostic mode of the integrated circuit as a function of the mode configuration data and when the life cycle data is indicative of the integrated circuit being in a production state or a failure analysis state.

21. The integrated circuit of claim 19, wherein the integrated circuit is a Field Programmable Gate Array (FPGA), a Digital Signal Processor (DSP) or an automotive microcontroller.

* * * * *